May 19, 1953  F. A. SCHICK ET AL  2,639,170
CARTRIDGE TYPE SEAL
Filed March 11, 1952  2 Sheets-Sheet 1
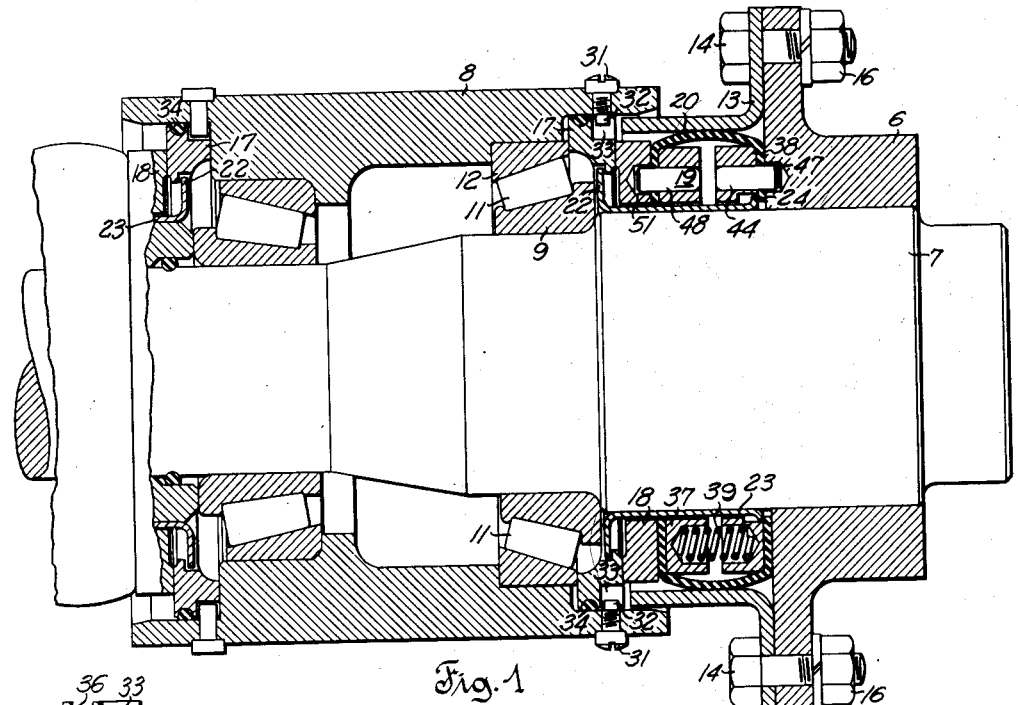
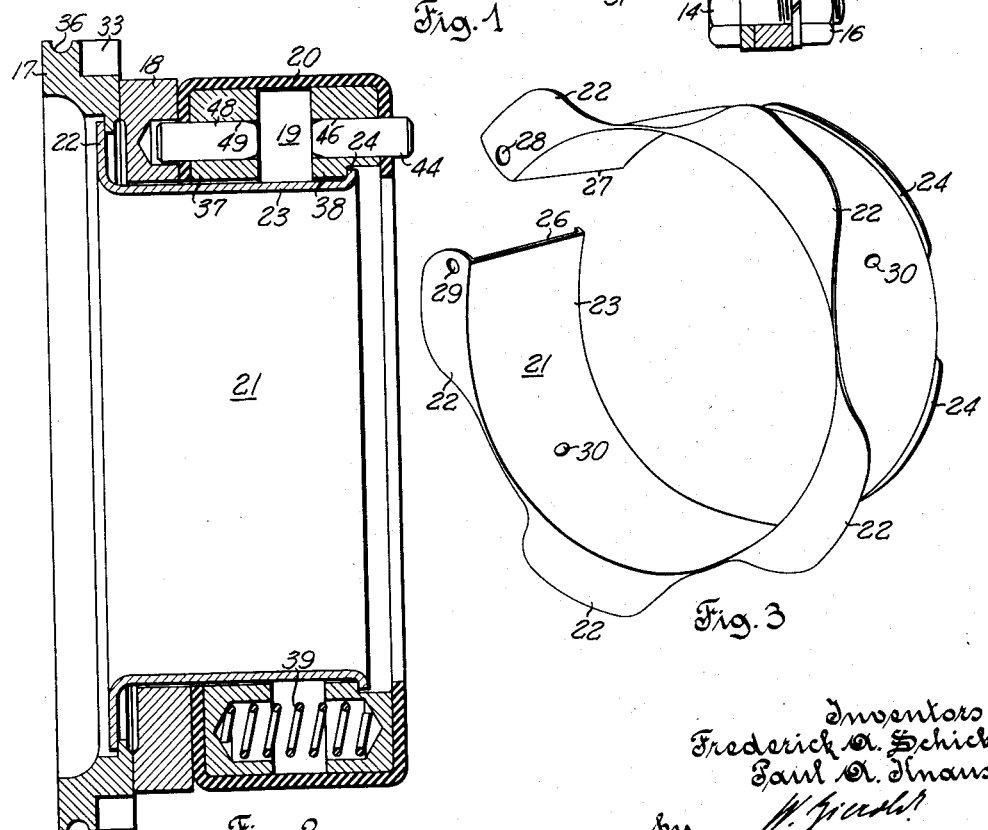
Inventors
Frederick A. Schick
Paul A. Knaust
by
Attorney Inventors
Frederick A. Schick
Paul A. Knaust
by
Attorney Patented May 19, 1953

2,639,170

UNITED STATES PATENT OFFICE 2,639,170

CARTRIDGE TYPE SEAL

Frederick A. Schick and Paul A. Knaust, Springfield, Ill., assignors to Allis-Chalmers Manufacturing Company, Milwaukee, Wis.

Application March 11, 1952, Serial No. 276,002

6 Claims. (Cl. 286—11)

This invention relates to seals of the axial contact type and it is more particularly concerned with an improved package type seal in which the component parts of the seal are prevented from coming apart.

It is desirable to keep the various parts of axial contact type seals in package or cartridge form to facilitate installation, replacement, shipment and other handling of the seal. It has heretofore been suggested that these seals be maintained in package form by a sleeve which has a flange at one end and another flange at the other end which must be formed after the seal parts, including the sleeve, are in assembled condition. The production of such a flange on the retaining sleeve, after installation of such sleeve, requires special equipment; and, once the seal is in packaged form, breakdown of the seal into its component parts is not accomplished easily. Circumstances may require replacement of a component part of the seal and in such a situation it is desirable to have a retaining means which can be quickly removed or disengaged. The usual package type seal contains an axially movable sealing ring but does not include a complementary abutment ring although such would be desirable in situations where the sealing and abutment rings are installed, removed, replaced, shipped and otherwise handled in preassembled condition.

It is an object of the present invention to provide an improved package type axial contact seal unit which may readily be disassembled, if desired, without demolishing or destroying any of its component parts.

It is a further object of the present invention to provide an improved package type axial contact seal in which an axially movable sealing ring and a complementary abutment ring are component parts of the assembled unit.

These and other objects will be evident from the following description when read in connection with the accompanying drawings in which:

Fig. 1 is a sectional view of a wheel and axle assembly showing an axial contact type seal installed to protect a wheel bearing;

Fig. 2 is an enlarged cross sectional view of the seal unit incorporated in the assembly shown in Fig. 1, and illustrating its detached condition;

Fig. 3 is a perspective view of a tubular retainer forming part of the seal assembly shown in Figs. 1 and 2;

Figure 4:
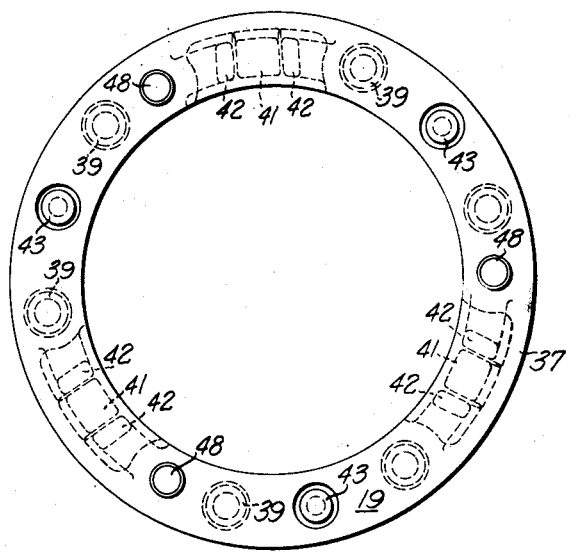
Fig. 4 is a side view of a backing unit incorporated in the axial contact type seal of Figs. 1 and 2.

Referring to Fig. 1 of the drawings, a stationary bracket 6 mounts an axle 7, and a rotary wheel hub 8 is mounted on the axle by means of a pair of axially spaced anti-friction bearings each comprising an inner raceway 9, rollers 11 and an outer raceway 12.

A flanged annular skirt 13 is attached to bracket 6 by bolts 14 and nuts 16 and together with wheel hub 8, axle 7, and bracket 6 defines a space wherein the seal assembly is located.

Referring to Fig. 2, the seal assembly is shown to generally comprise an abutment ring 17, a sealing ring 18, a backing unit 19, a seal boot 20, and a radially resilient retainer 21 which is shown more clearly in Fig. 3. The retainer 21 has a circumferential series of tongues 22 which are formed on a circumferential wall part 23 at the axially outer side of and extend in radially overlapping relation to the abutment ring 17. Another circumferential series of tongues 24 are formed on the wall part 23 at the axially outer side of and extend in radially overlapping relation to the backing unit 19. In the condition of the seal assembly as shown in Fig. 2, the abutment ring 17, the sealing ring 18 and the backing unit 19 are secured against axial separation by the retainer 21. The tongues 24 are of a radial width enabling them to clear the backing unit 19, the sealing ring 18 and the abutment ring 17 upon elastic radial contraction of the retainer 21, for the purpose of removing the retainer axially from the assembly, as will be explained more fully hereinbelow.

Referring to Fig. 3, a gap in the wall part 23 of the retainer 21 defines edges 26 and 27 which extend axially of the seal between opposite sides of the retainer and which are circumferentially spaced from each other in the assembled condition of the seal unit. The width of the circumferential gap between edge portions 26 and 27 is such as to allow the retainer 21 to be radially contracted to a condition wherein the radially outer edges of tongues 24 lie within a circle whose diameter is less than the inner diameter of the sealing ring 18 and of the backing unit 19. Such radial contraction of the retainer may be effected by drawing edges 26 and 27 toward each other, and holes 28 and 29 are provided in relatively adjacent tongues 22 to receive jaw ends of pointed pliers for drawing the edges 26 and 27 together.

Holes 30 in the wall part 23 may be provided, if desired, for admitting lubricant to the relatively movable parts of the seal assembly.

Referring again to Fig. 1, it is seen that in the installed condition of the seal assembly tongues 22 and 24 are spaced axially from the outer sides of the abutment ring 17 and backing unit 19, respectively, due to the axially contracted state of the seal assembly. The abutment ring 17 of the seal assembly is made to rotate with the wheel hub 8 by screws 31 which have an end portion 32 extending into notches 33 of the abutment ring 17. An O-ring 34 of rubber or rubber-like material is compressed in an interior bore of the wheel hub 8 and is seated in a groove 36 formed at the periphery of the abutment ring 17.

Figure 5:
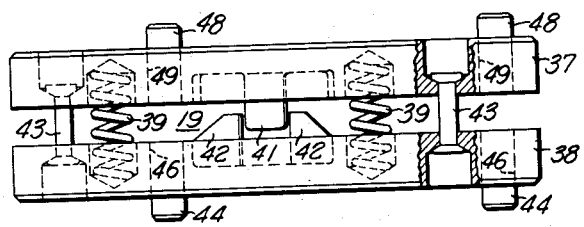
Fig. 5 is a top view of the backing unit shown in Fig. 4.

Referring to Figs. 4 and 5, the backing unit 19 is comprised of a pressure ring 37, a backing ring 38 and coil springs 39 interposed between pressure ring 37 and backing ring 38. To prevent rotation of the pressure ring 37 relative to the backing ring 38, lugs 41 are formed on the pressure ring 37 to engage with ears 42 formed on the backing ring 38. Rivets 43 are installed during assembly of the backing unit to prevent the component parts of the backing unit from becoming separated. After assembly of the seal unit the rivets are not operative to limit axial expansion of the backing unit. The backing unit is prevented from rotating by pins 44 which are press fitted into holes 46 of the backing ring 38 and extend into holes 47 of the stationary bracket 6. The sealing ring 18 is prevented from rotating by pins 48 which are press fitted into holes 49 in the pressure ring 37 and extend into holes 51 in the sealing ring 18.

The coil springs 39 are in a state of axial compression when the seal assembly is in an installed condition as in Fig. 1 and also when the seal assembly is in a noninstalled condition as in Fig. 2. As a result, the sealing faces of the abutment ring 17 and the sealing ring 18 are maintained in contact at all times. It is desirable that the sealing faces of the abutment ring and sealing ring be kept in contact prior to installation so that foreign particles are prevented from entering between the sealing faces of the abutment ring and the sealing ring.

In the assembled condition of the seal unit as shown in Fig. 2, the retainer 21 is in a free state of radial expansion in which the outside diameter of the wall part 23 is slightly smaller than the inside diameters of the sealing ring 18 and of the rings 37 and 38 of the backing unit 19. The radially outer edges of the tongues 24 are slightly spaced radially from the confronting radially inner periphery of the abutment ring 17 when the retainer is in its mentioned free state of radial expansion. Due to this arrangement, the retainer 21 will be effective not only to prevent axial separation of the component parts of the seal unit but also to retain the parts in substantial coaxial relation while the seal unit is in the detached condition in which it is shown in Fig. 2. In the installed condition of the seal unit as shown in Fig. 1, the retainer 21 is in the same free state of radial expansion as in the noninstalled condition of the seal unit, and the slight radial clearance between the wall part 23 of the retainer and the inner periphery of the sealing ring 18 enables the sealing ring to move axially back and forth substantially without drag on the retainer 21.

It will be seen that the retainer of the herein disclosed seal assembly, which comprises wall part 23 and tongues 22 and 24, is operative to maintain the component parts of the seal assembly, including a sealing ring and a complementary abutment ring, in convenient package form. It is also seen that the retainer can be quickly installed or removed, without demolishing or destroying any of the component parts of the seal.

It should be understood that it is not intended to limit the invention to the particular forms and details described hereinabove and that the invention includes such other forms and modifications as are embraced by the scope of the appended claims.

It is claimed and desired to secure by Letters Patent:

1. An axial contact type seal unit comprising, in combination, an axially shiftable sealing ring; an abutment ring at one side of said sealing ring; an annular, axially resilient backing unit at the other side of said sealing ring; a radially contractible and expansible tubular element in coaxial, radially confronting relation to said rings and backing unit; flange means formed on said tubular element at the axially outer side of and extending in radially overlapping relation to said abutment ring; and other flange means formed on said tubular element at the axially outer side of and extending in radially overlapping relation to said backing unit, one of said flange means being of a radial width enabling said one flange means to clear said rings and backing unit upon radial, elastic deformation of said tubular element.

2. An axial contact type seal unit comprising, in combination, an axially shiftable sealing ring; an abutment ring at one side of said sealing ring; an annular, axially resilient backing unit at the other side of said sealing ring; a radially contractible and expansible tubular element in coaxial, radially confronting relation to said rings and backing unit; a first circumferential series of radial tongues formed on said tubular element at the axially outer side of and extending in radially overlapping relation to said abutment ring; and a second circumferential series of radial tongues formed on said tubular element at the axially outer side of and extending in radially overlapping relation to said backing unit, the tongues of one of said series being of a radial width enabling them to clear said rings and backing unit upon radial, elastic deformation of said tubular element.

3. An axial contact type seal unit comprising, in combination, an axially shiftable sealing ring; an abutment ring at one side of said sealing ring; an annular, axially resilient backing unit at the other side of said sealing ring; a radially contractible and expansible tubular element in coaxial, radially confronting relation to said rings and backing unit; flange means formed on said tubular element at the axially outer side of and extending in radially overlapping relation to said abutment ring; and other flange means formed on said tubular element at the axially outer side of and extending in radially overlapping relation to said backing unit, said other flange means being of a radial width enabling them to clear said rings and backing unit upon radial, elastic deformation of said tubular element.

4. An axial contact type seal unit comprising, in combination, an axially movable sealing ring; an abutment ring at one side of said sealing ring; an annular, axially resilient backing unit at the other side of said sealing ring; a radially contractible and expansible tubular element extending axially through said rings and backing unit; flange means formed on and extending radially outward from said tubular element at the axially outer side of said abutment ring; and other flange means formed on and extending radially outward from said tubular element at the axially outer side of said backing unit; the radial width of one of said flange means and the inside diameters of said rings and backing unit being relatively proportioned so as to permit axial withdrawal of said tubular element from said rings and backing unit upon elastic, radial contraction of said tubular element.

5. An axial contact type seal unit comprising, in combination, an axially shiftable sealing ring, an abutment ring and a backing ring at opposite sides, respectively, of said sealing ring, resilient pressure means operatively interposed between said backing ring and said sealing ring; a radially contractible and expansible tubular element in coaxial, radially inner relation to said rings and pressure means; flange means formed on said tubular element at the axially outer side of and extending in radially overlapping relation to said abutment ring; and other flange means formed on said tubular element at the axially outer side of and extending in radially overlapping relation to said backing ring, said other flange means being of a radial width enabling them to clear said rings and pressure means upon radial, elastic deformation of said tubular element.

6. An axial contact type seal unit comprising, in combination, an axially movable sealing ring, an abutment ring at one side of said sealing ring; an annular, axially resilient backing unit at the other side of said sealing ring; a circumferentially split tubular element presenting a radially contractible annular wall portion within said rings and backing unit; flange means formed on said tubular element at the axially outer side of and extending in radially overlapping relation to said abutment ring; and other flange means formed on said tubular element at the axially outer side of and extending in radially overlapping relation to said backing unit, the radial width of one of said flange means and the inside diameters of said rings and backing unit being relatively proportioned so as to permit axial withdrawal of said tubular element from said rings and backing unit upon elastic, radial contraction of said tubular element.

FREDERICK A. SCHICK.
PAUL A. KNAUST.

No references cited.